United States Patent [19]

Pedrazzi

[11] Patent Number: 5,104,362

[45] Date of Patent: Apr. 14, 1992

[54] MECHANICAL DEVICE COMBINING THE FUNCTIONS OF A SELF-LOCKING DIFFERENTIAL AND A TORQUE DIVIDER AND OPERATING TO A GIVEN RATIO BETWEEN TWO DRIVEN HALFSHAFTS

[75] Inventor: Oliviero Pedrazzi, Modena, Italy

[73] Assignee: Bugatti Automobili S.P.A., Modena, Italy

[21] Appl. No.: 483,270

[22] Filed: Feb. 16, 1990

[30] Foreign Application Priority Data

Oct. 23, 1987 [IT] Italy ............... 40140 A/87

[51] Int. Cl.⁵ .................................. F16H 1/38
[52] U.S. Cl. .................................. 475/227
[58] Field of Search .......... 475/226, 227; 180/247, 180/248

[56] References Cited

U.S. PATENT DOCUMENTS

| | | | |
|---|---|---|---|
| 2,898,779 | 8/1959 | Mickelson | 74/715 X |
| 3,237,483 | 3/1966 | Kelley et al. | 74/715 |
| 3,849,862 | 11/1974 | Benjamin | 74/715 X |
| 3,899,939 | 8/1975 | Hilado | 74/715 |
| 3,902,237 | 9/1975 | Benjamin | 74/715 X |
| 4,495,835 | 1/1985 | Gleasman | 74/715 |

FOREIGN PATENT DOCUMENTS

| | | | |
|---|---|---|---|
| 3428865 | 9/1985 | Fed. Rep. of Germany | |
| 0893311 | 6/1944 | France | 74/715 |
| 1391412 | 1/1965 | France | |

Primary Examiner—Dwight Diehl
Attorney, Agent, or Firm—Darby & Darby

[57] ABSTRACT

The device combines the functions of a self-locking differential and a torque divider and operates to a prescribed ratio between the two driven halfshafts. The adjacent ends of the two halfshafts (1, 2) carry respective worms (11, 21), dissimilar in diameter, each paired with at least one worm wheel; these two worm wheels (12, 22) are carried by the cage (3) of the differential, and interconnected in rotation by way of a mechanical train having an overall transmission ratio matched exactly to the ratio existing between the pitch diameters of the worms (11, 21).

6 Claims, 4 Drawing Sheets

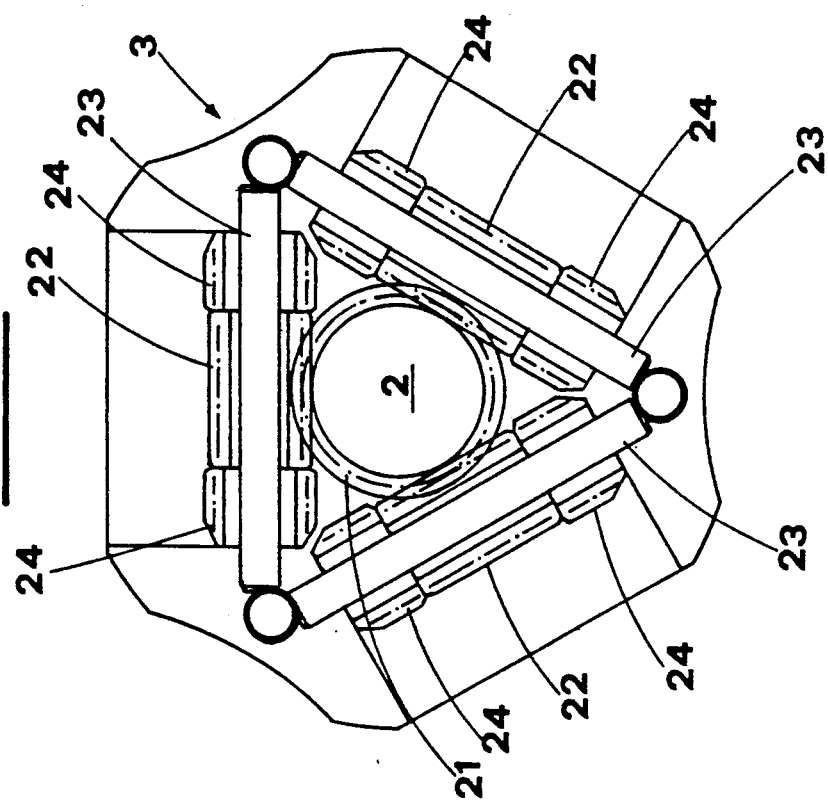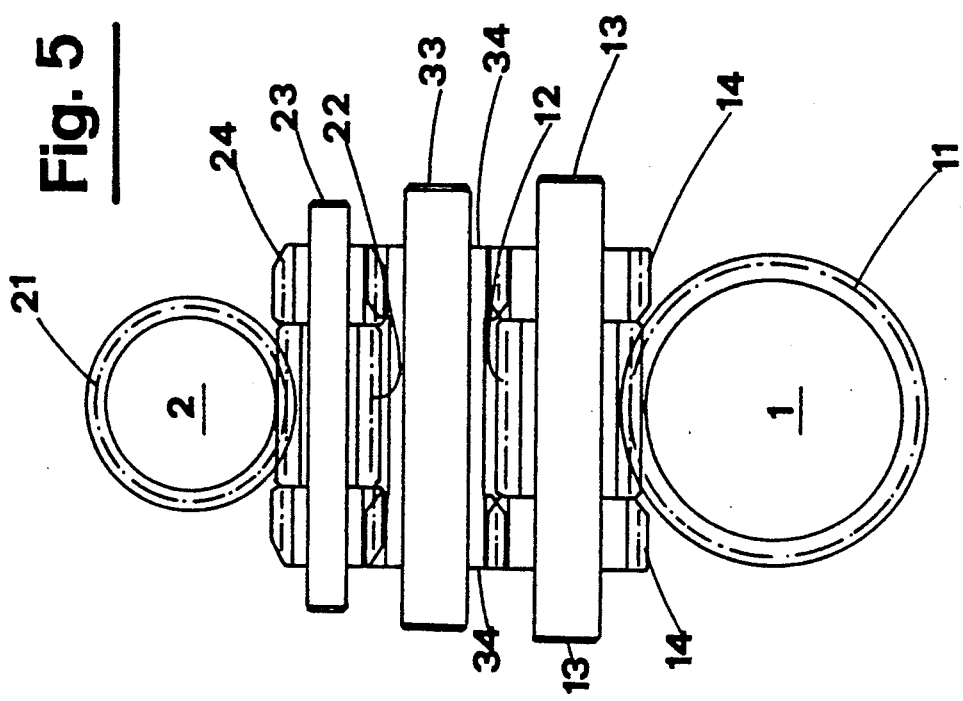

MECHANICAL DEVICE COMBINING THE FUNCTIONS OF A SELF-LOCKING DIFFERENTIAL AND A TORQUE DIVIDER AND OPERATING TO A GIVEN RATIO BETWEEN TWO DRIVEN HALFSHAFTS

This is a continuation division of application Ser. No. 260,808, filed Oct. 20, 1988 now abandon.

BACKGROUND OF THE INVENTION

The invention relates to a mechanical device that combines the function of self-locking differential and torque divider, and is designed to operate to a given ratio between two halfshafts.

Such a device is intended specifically as a master differential for vehicles with more than two drive wheels, though no limitation is implied, since the device can serve as a differential in any driveline where special requirements may dictate an unequal distribution of torque to two driven halfshafts. One of the applications envisaged for the invention is that of operation as a combined torque divider and self-locking master differential in a four-wheel drive or other multi-drive-axle vehicles, in which a fundamental requirement exists for self-locking differentials that will transmit dissimilar values of torque to different shafts. In a four-wheel drive vehicle, for instance, the load on the front and rear axles will never be distributed evenly, and to compensate, torque must be distributed to the two axles unevenly.

Attempts have been made to meet this requirement by designing torque-dividing differentials with self-locking systems, in which the typical differential action, i.e. that of enabling two halfshafts to rotate at different speeds, is either inhibited or limited according to the difference in speed or torque registering between the halfshafts. Systems of this type are generally complicated, and in the great majority of instances are capable of locking (that is, of engaging positively) only in response to a difference in speed or torque occasioned by loss of grip at the driving wheels.

Accordingly, the object of the present invention is one of eliminating the drawbacks and overcoming the limitations outlined above.

SUMMARY OF THE INVENTION

The stated object, and others besides, are realized with a mechanical device according to the invention disclosed, which is designed for motor vehicles in particular and combines the functions of a self-locking differential and a torque divider, torque being distributed proportionately with a prescribed ratio between the driven halfshafts.

The device comprises two worms, each one keyed to a respective halfshaft, and at least two worm wheels, each offered in meshing contact to one of the two worms and forming an irreversible gear pair with the worm. The worm wheels are carried by the cage of the differential and turn about respective axes connected in mutual rotation through the agency of a further gear pair.

It is an essential feature of the invention that the two worms keyed to the two halfshafts exhibit dissimilar diameters, the ratio between which is identical to the overall transmission ratio created between the two worm wheels by way of the interconnecting gear pair.

A first advantage afforded by the device disclosed is that it ensures maximum traction compatible with the grip existing between wheels and terrain.

A further advantage of the device, compared with devices as embraced by the prior art, is that it requires none of the generally rather complicated systems used conventionally to produce self-locking action in response to wheel spin.

BRIEF DESCRIPTION OF THE DRAWINGS

The invention will now be described in detail, by way of example, with the aid of the accompanying drawings, in which:

FIG. 4 is the section through IV—IV in FIG. 1;
FIG. 5 is a view of the device developed in a single transverse plane, illustrating the meshing contact between the components shown in FIGS. 1 to 4.

DESCRIPTION OF THE PREFERRED EMBODIMENTS

Figure 1:
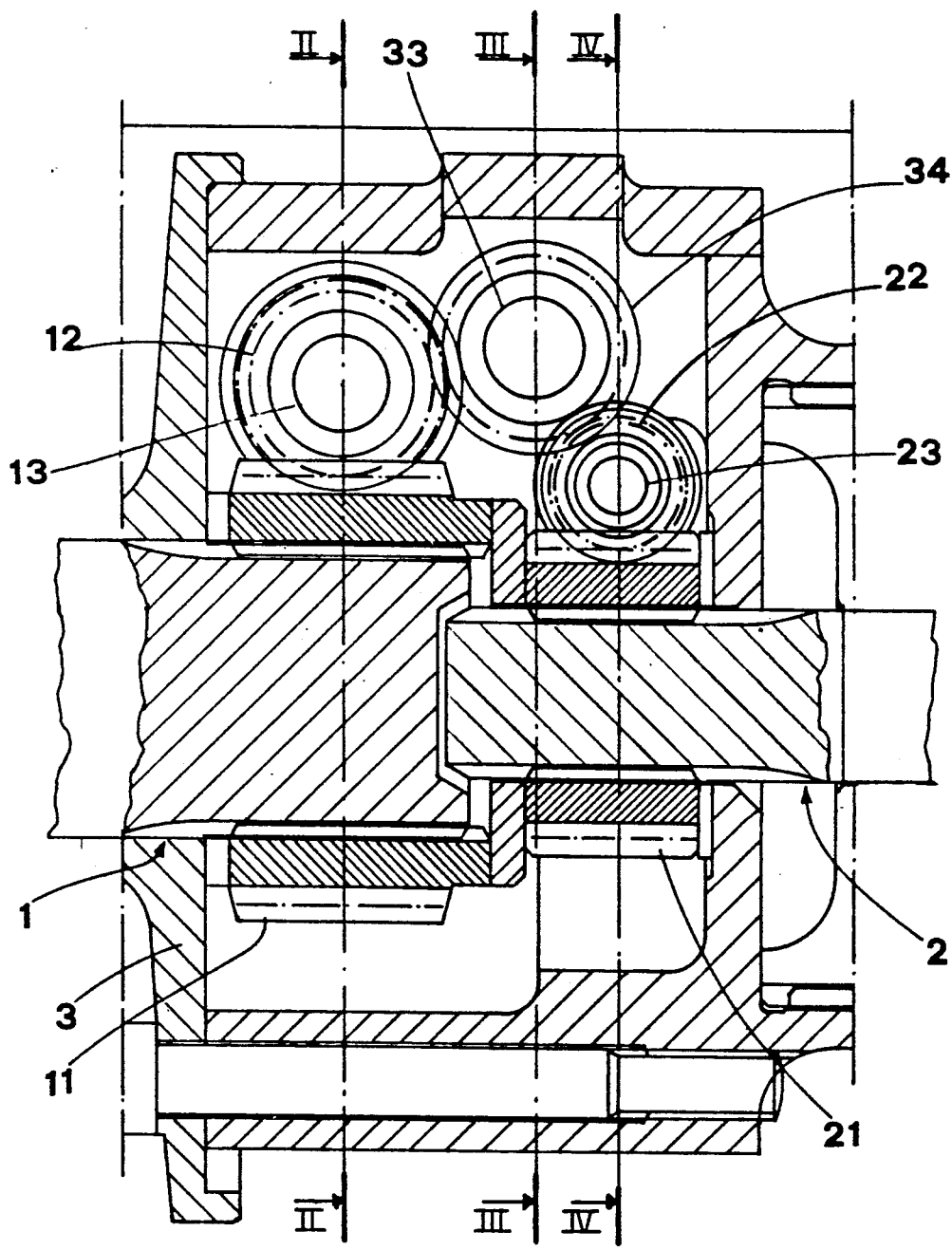
FIG. 1 is a schematic representation of the device, in accordance with the invention viewed in axial section.
Figure 3:
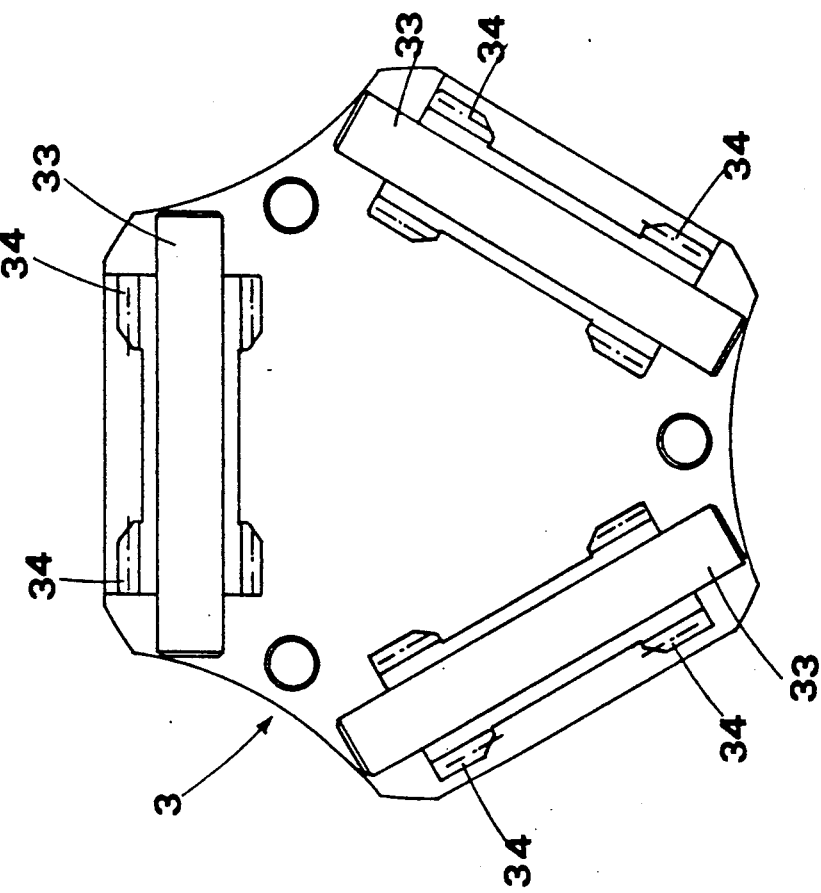
FIG. 3 is the section through III—III in FIG. 1.

With reference to the drawings, 1 and 2 denote two coaxial halfshafts the adjacent ends of which are accommodated by a cage 3 supporting the train of the device: in receipt of drive from a transmission not shown in the drawings, the cage 3 is caused to rotate about the axis of the halfshaft 1 and 2. 11 denotes a worm keyed to the end of the one half-shaft 1, and 21 denotes a second worm keyed in like manner to the end of the other halfshaft 2. The lead angle of the two worms (11, 21) is the same.

Figure 2:
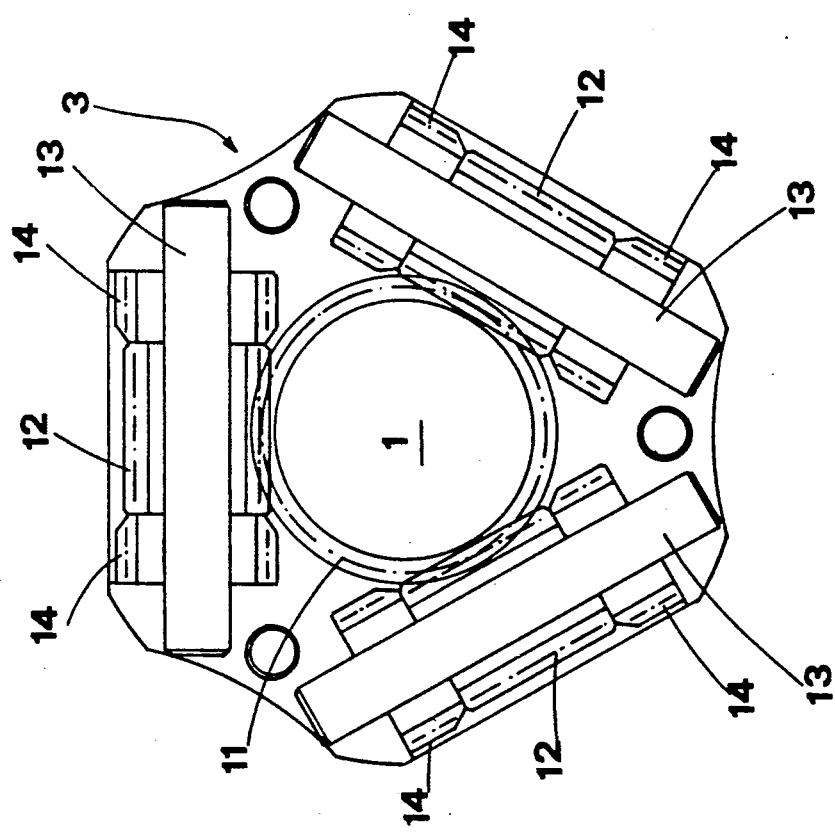
FIG. 2 is the section through II—II in FIG. 1.
Figure 6:
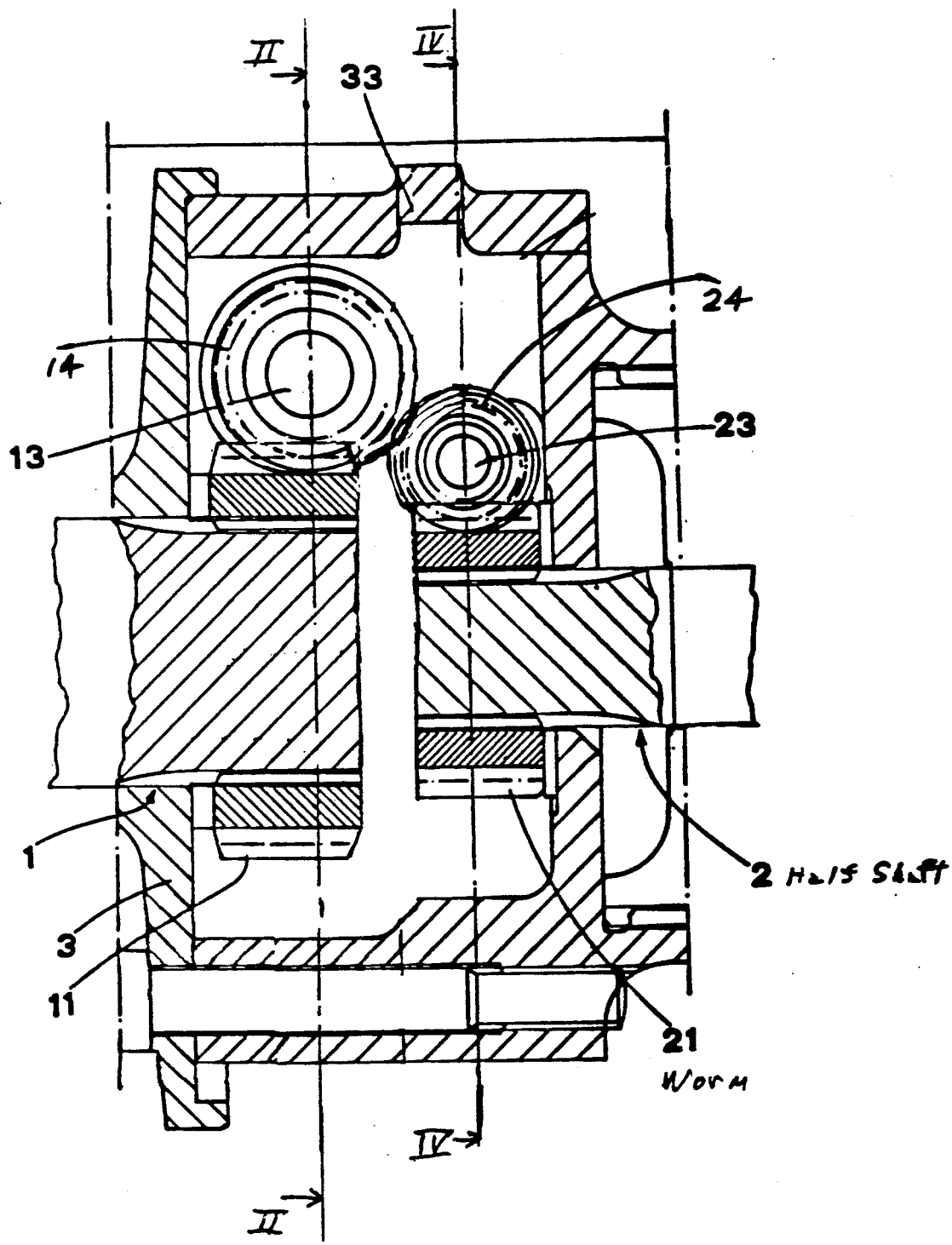
FIG. 6 is a view similar to FIG. 1 of an alternative embodiment of the device in accordance with the invention.

The first worm 11 is in constant mesh with three identical worm wheels 12 which turn on shafts 13 mounted to the cage 3 in an equilateral arrangement encircling the worm 11 (FIG. 2).

Similarly, the second worm 21 is in constant mesh with three further identical worm wheels 22 that rotate on shafts 23 mounted to the cage 3 in the same equilateral arrangement (FIG. 4).

Thus, each of the two worms 11 and 21 is keyed to a relative halfshaft 1 and 2 and in constant mesh with a set of three worm wheels turning on shafts carried by the cage 3, and more exactly, the two sets of wheels 12 and 22 are mounted to the cage 3 with their respective axes in parallel alignment, i.e. each wheel 12 of one set lying with its axis or rotation parallel to that of a corresponding wheel 22 of the other set.

Each worm 11, 21 and its respective set of worm wheels 12 and 22 constitutes an irreversible gear pair.

Each single worm wheel 12 of the first set is flanked by two coaxially disposed gears 14 located one one either side and mounted in such a way as to remain completely clear of the worm 11 engaged by the wheel 12 situated between them; similarly, each worm wheel 22 of the second set is flanked by two coaxially disposed gears 24, one on either side, which remain totally clear of the relative worm 21. In each case, the gears 14 and 24 turn as one with the relative worm wheel 12 and 22.

Each two gears 14 and 24 that occupy corresponding positions in the cage (see FIGS. 2 and 4) constitute a meshing pair, but do not mesh in direct contact, notwithstanding their relative shafts 13 and 23 are disposed parallel; rather, the gears 14 and 24 are interconnected by way of idlers, denoted 34, that are mounted to further shafts 33 located parallel to and accommodated together with the worm wheel shafts 13 and 23 internally of the cage 3.

The worms 11 and 21 keyed to the two halfshafts 1 and 2 will be seen to exhibit dissimilar diameters, and according to the invention, the ratio between these diameters is identical to the overall ratio between the interconnecting gear pairs 14 and 24, thus ensuring a unitary transmission ratio between the halfshafts 1 and 2.

With the arrangement described, torque transmitted to the two worms 11 and 21, hence to the relative halfshafts 1 and 2, will be proportional to the pitch diameter of the worm in each instance, and accordingly, torque transmitted to the cage 3 as it rotates about the axis of the halfshafts will be divided into dissimilar components, likewise in proportion to the respective pitch diameters of the worms 11 and 21.

The device according to the invention is therefore ideally suited for operation as master differential in a four-wheel or multi-axle drive motor vehicle, given its ability to divide driving torque between two driven shafts proportionately with the relative loads to which they are subject.

In contrast with prior art embodiments, a device according to the invention ensures the maximum traction obtainable, compatible with the degree of grip between wheels and terrain, even with one of the drive wheels slipping; moreover, operation of the device is uninterrupted, and distribution of torque to the driven halfshafts is gradual in the extreme.

It will be observed further that the operational characteristics of the device are such as to place no obstacle in the way of association with systems operating independently on the drive wheels for the purposes of monitoring slip.

In an alternative embodiment of the invention, the idlers 34 might be discarded from the train that interconnects the two sets of worm wheels, in which case the relative sets of gears 14 and 21 will mesh in direct contact.

What is claimed is:

1. A differential and torque divider operating to a given rotational ratio between two driven halfshafts (1, 2), comprising:
    two worms (11, 21) of dissimilar diameter, each worm being keyed to a corresponding halfshaft (1, 2);
    at least two worm wheels (12, 22), each of said worm wheels being in meshing contact to a corresponding worm (11, 21);
    a cage (3), said cage rotatably supporting said worm wheels for turning about respective axes;
    a gear pair rotatably interconnecting the two worm wheels (12, 22), the overall torque transmission ratio of said gear pair being identical to the ratio existing between the diameters of the two worms (11, 21).

2. A device as in claim 1, wherein the lead angle of the two worms (11, 21) is the same.

3. A differential and torque divider operating to a given ratio between two driven halfshafts (1, 2), comprising:
    two worms (11, 21) of dissimilar diameter, each worm having a thread and being keyed to a corresponding halfshaft (1, 2);
    at least two worm wheels (12, 22), each of said worm wheels being in meshing contact to a corresponding worm (11, 21);
    a cage (3), said cage rotatably supporting said worm wheels for turning about respective axes;
    a gear pair rotatably interconnecting the two worm wheels (12, 22), the overall transmission ratio of said gear pair being identical to the ratio existing between the diameters of the two worms (11, 21), wherein the two worm wheels paired with the worms are mounted to the cage and turn about respective axes disposed parallel with one another, and the gear pair includes at least two gears meshing in direct contact, a first rigidly and coaxially associated with one said worm wheel, and a second rigidly and coaxially associated with the other one of said worm wheels.

4. A differential and torque divider as in claim 3, wherein the lead angle of the two worms are the same.

5. A differential and torque divider operating to a given ratio between two driven halfshafts (1, 2), comprising:
    two worms (11, 21) of dissimilar diameter, each worm having a thread and being keyed to a corresponding halfshaft (1, 2);
    at least two worm wheels (12, 22), each of said worm wheels being in meshing contact to a corresponding worm (11, 21);
    a cage (3), said cage rotatably supporting said worm wheels for turning about respective axes;
    a gear pair rotatably interconnecting the two worm wheels (12, 22), the overall transmission ratio of said gear pair being identical to the ratio existing between the diameters of the two worms (11, 21), wherein the two worm wheels (12, 22) paired with the worms (11, 21) are mounted to the cage (3) and turn about respective axes disposed parallel with one another, the gear pair including at least two gears (14, 24), first gear (14) rigidly and coaxially associated with one said worm wheel (12) and a second gear (24) rigidly and coaxially associated with the other said worm wheel (22), said first gear (14) and said second gear (24) meshing in indirect contact by connection in mutual rotation by way of an idler (34), the threads of the two worms (11, 21) being of opposite hand.

6. A differential and torque divider as in claim 5, wherein the lead angle of the two worms is the same.

* * * * *